March 23, 1954   W. J. HUGHES   2,673,338
CONVERTER
Filed March 22, 1952                                2 Sheets-Sheet 1
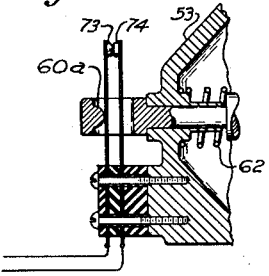
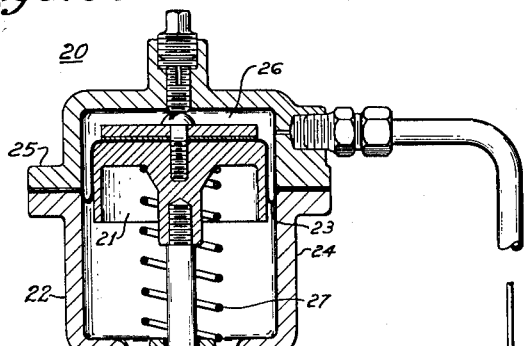
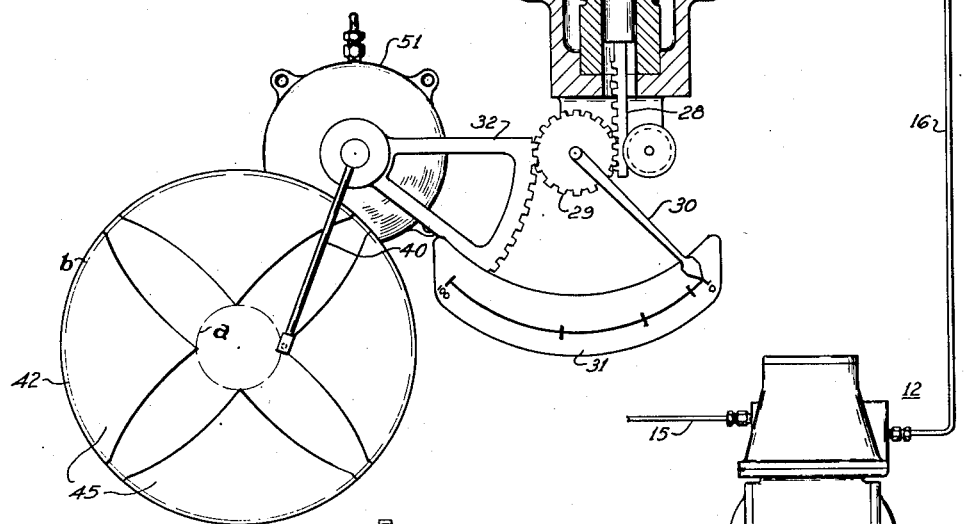
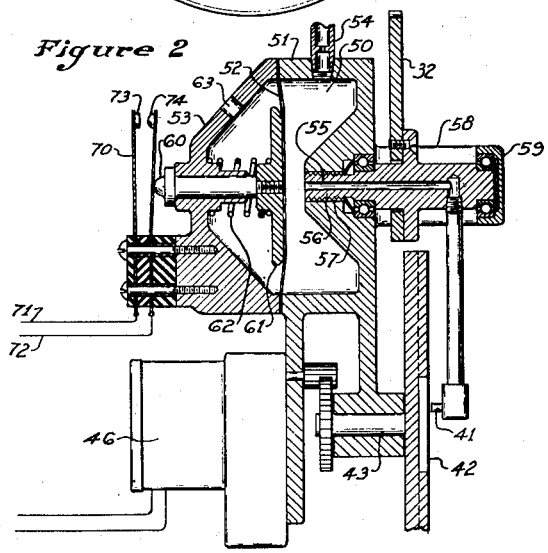
INVENTOR.
Walter J. Hughes
BY
Agent March 23, 1954 W. J. HUGHES 2,673,338
CONVERTER
Filed March 22, 1952 2 Sheets-Sheet 2

INVENTOR.
Walter J. Hughes
BY
Agent

Patented Mar. 23, 1954

2,673,338

UNITED STATES PATENT OFFICE 2,673,338

CONVERTER

Walter J. Hughes, Tucson, Ariz., assignor to Infilco Incorporated, Tucson, Ariz., a corporation of Delaware Application March 22, 1952, Serial No. 278,086

19 Claims. (Cl. 340—206)

This invention relates to an apparatus for obtaining a timed interval proportional to a condition and particularly to an apparatus of this general type which is pneumatically operated. The timed interval obtained may be utilized, for example, to provide an electrical impulse of corresponding duration for operating a counter or a relay in a power circuit used for driving a machine, such as a feeder, for intervals timed in proportion to the condition.

It is an object of this invention to provide a simple apparatus for obtaining a timed interval of a duration which is a function of a condition.

Another object is to provide an apparatus converting a pressure varying as a linear or non-linear function of a condition to a timed interval varying as a linear function of the condition.

Another object is to provide an apparatus of this general type capable of providing timed intervals over a wide range and with a high degree of accuracy at the lower values of the range.

Another object is to provide an apparatus for remotely actuating a machine for periods proportional to a condition by telemetered impulses varying proportional to a condition.

Another object is to provide means for actuating a meter or counter mechanism by a flow sensing instrument wherein all reaction effects of the meter or counter mechanism upon the sensing instrument and vice versa are eliminated.

Another object is to provide an instrument of this general type which utilizes a low pressure air scanning jet and whose consumption of air is not higher than that of the usual air operated instruments.

Other objects of the invention will become apparent from consideration of the following detailed description and of the claims.

The invention is particularly suited for providing a timed interval in proportion to a fluid flow which permits driving a counter or actuating a feeder or other machine for periods proportional to flow and will, therefore, be described in connection with fluid flow. It is, however, to be understood that the invention is not limited to this particular application, but can be used to provide timed intervals in proportion to other conditions.

In the preferred embodiment of the invention a controlled measuring air pressure proportional to a condition, for example to flow, is utilized to position an air jet scanning tube over a revolving flat disk having four raised camlike faces, each shaped to convert the measuring pressure to a measure of the flow in timed intervals. The disk is revolved at constant speed at ¼ revolution per minute so that one face passes the scanning tube each minute. Back pressure built up in the air system while the raised cam faces pass in close proximity to the jet tube and obstruct the flow of air therefrom operates to close an electric circuit for a duration in proportion to flow.

When the controlled metering pressure is obtained from a non-linear converter and is proportional to flow head, the cam faces are shaped to convert the flow head to a direct measure of the flow; when the metering pressure is obtained from a linear converter and is directly proportional to flow, the cam faces are shaped for linear relationship with the metering pressure.

The invention will be more readily understood by reference to the drawings wherein:

Figure 1 is a diagrammatic view, partly in section, of an embodiment of the invention utilizing a controlled measuring pressure whose value is proportional to flow head;

Figure 2 is a vertical sectional view of the cam carrying disk and its drive means, the air jet system and the electric switch which is opened and closed by the air system;

Figure 5 is a vertical sectional view of a detail of a modified embodiment.

Figure 4:
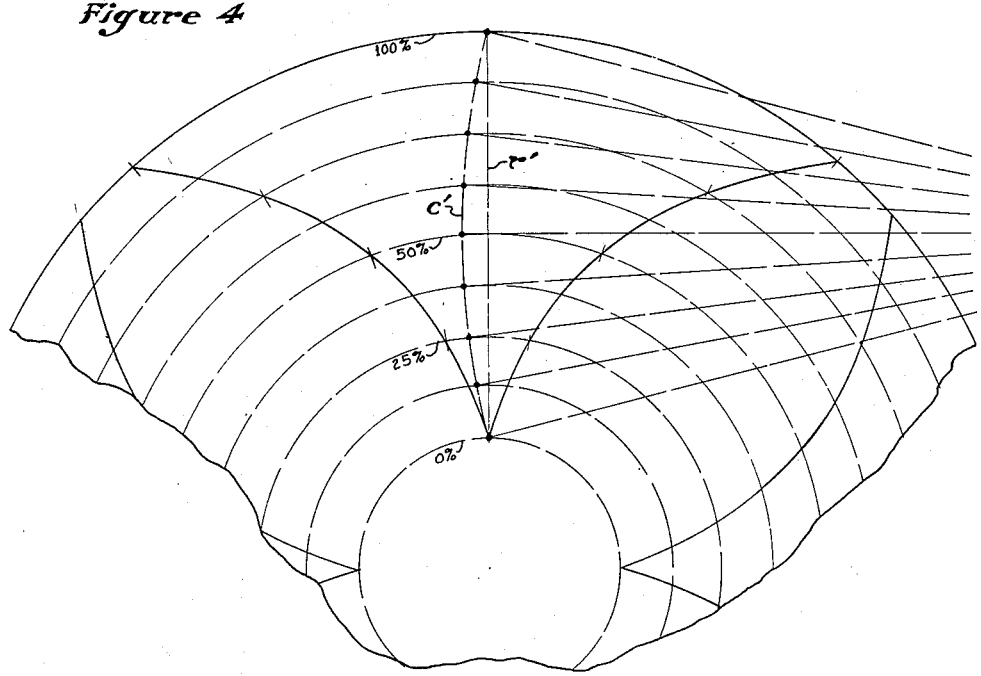
Figure 4 is an enlarged diagram of one of the cams shaped for deriving a timed interval in proportion to flow when the metering pressure is proportional to flow.

In Figure 1 a Venturi tube 10, forming a part of a conduit 11, is shown connected to a converter 12 by a high pressure conduit 13 and a low pressure conduit 14 leading from the Venturi inlet and throat, respectively. The converter 12 is shown for purposes of illustration as a pneumatic converter receiving its air supply through an air line 15. The converter 12 may be of the linear type, adapted to convert the pressure differential derived from the Venturi tube 10 to a controlled air pressure proportional to the flow through the conduit 11; or it may be of the non-linear type, which converts the Venturi differential head to a controlled air pressure proportional thereto. Such converters are well known in the art and need not be described herein. An example of a linear converter is shown in my Patent No. 2,520,547, and an example of a non-linear or pressure proportioning converter is shown in my Patent No. 2,584,455. In Figure 1 it is assumed for purposes of illustration that the converter 12 is of the non-linear type.

The controlled measuring air pressure varying as the flow head derived from the converter 12 is conveyed through a line 16 to a pressure responsive device 20. The piston 21 of the device 20 is sealed to the casing 22 by a roller type diaphragm 23 flanged between the body 24 and the cap 25 of the casing to form an airtight piston chamber 26 and permit substantially friction-free travel of the piston 21. Air pressure applied in the chamber 26 depresses the piston 21 against the force of a spring 27, the displacement being a measure of the flow head. (If converter 12 is of the linear type, the displacement is a direct measure of the flow.) Movement of the piston positions a rack 28, which in turn rotates a gear 29. An indicator 30 may be connected to the shaft of the gear 29 and be rotated with it over a dial 31 for ready indication of the magnitude of the metering pressure. The dial 31 is shown calibrated in proportion to flow head, or the square of the flow, as converter 12 is of the non-linear type. Obviously, if a linear converter is used, the flow increments on the dial 31 will be made equal. The apparatus described above is old and is not claimed herein except insofar as it cooperates with the new parts of the system.

A sector gear 32 meshes with the gear 29, the gearing being arranged so that the ratio of the radii of gear 29 and sector gear 32 may be of the order of 3 to 1, in which case, if the full range of the controlled measuring pressure is properly biased by the spring 27, the rack 28 will turn the gear 29 through an angular range of 90°, and the sector 32 through an angular range of 30°.

An air jet scanning tube 40 is pivotally supported in a manner to be described later, and the sector gear 32 is pivoted in common with the air jet tube 40 so that the two rotate together through the same angular range. The scanner 40 has an outlet portion 41 which is at right angles to the vertical extension of the tube 40 (see Figure 2). A disk 42 is rotatably supported on a drive shaft 43 to rotate in a plane normal to, and adjacent, the outlet end 41 of the scanner tube 40. Four raised cam faces 45 are mounted on the disk, as shown. A motor 46 rotates the shaft 43 through suitable gearing at constant speed at one-quarter revolution per minute so that one face 45 passes the end 41 of the scanner tube 40 during each cycle of a minute. Each cam face 45 is shaped to convert the measuring pressure, which in this case varies as the flow head, to a timed interval varying directly as the flow.

The use of four cam faces for the obstruction and release of the scanning air jet is optional. In the case of cams shaped like those of the preferred embodiment shown in the figures, the use of four, each in a time cycle interval of 90°, gives edges that do not depart greatly from radial—thus the cutoff and release of the scanning air jet is readily predetermined and sharply defined. Obviously, a shaped cam can be developed for a disk turning once per minute. However, the edges of such a cam would depart greatly from the nearly radial, and the obstruction and release of the scanning jet would become less accurate as to the exact timing desired.

Figure 3:
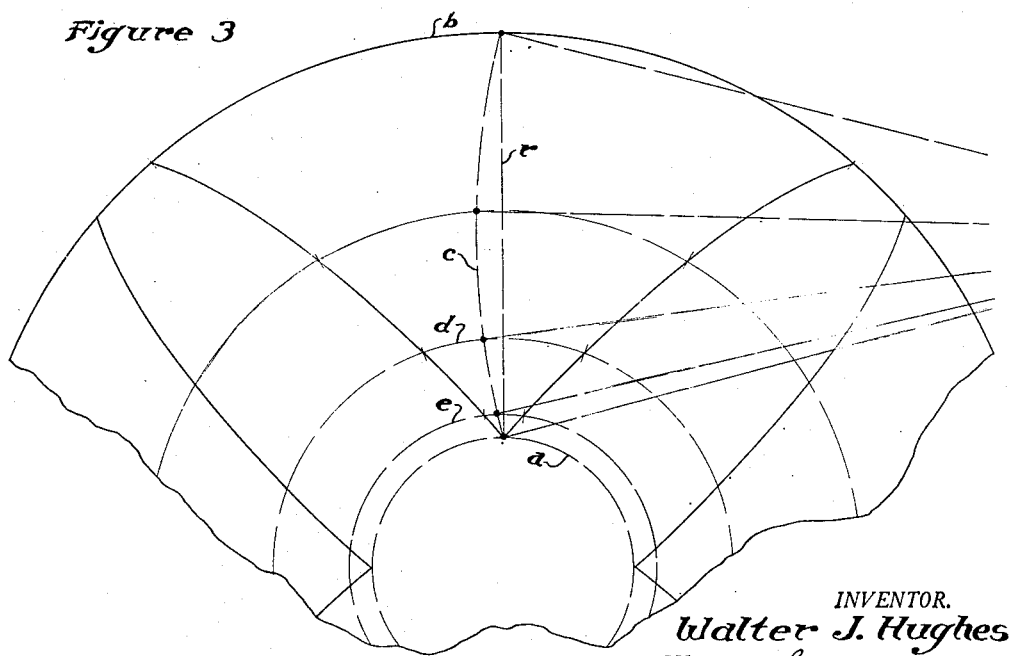
Figure 3 is an enlarged diagram of one cam shaped for deriving a timed interval in proportion to flow when the metering pressure is proportional to flow head.

Referring now to the enlarged diagrammatic view of a cam face shown in Figure 3, the cam radius $r$ from the zero flow value circle $a$ to the 100 percent flow value circle $b$ is made equal to the chord of the angle $c$ through which the air jet tube 40 travels. In this square root cam the radial values of the several angular layout positions of the scanner tube measure the flow heads and are proportional to the square of the flow, while the included angles of the cam face edges at the various radial value circles vary directly with the flow. The included angle of the cam face on the 100 percent circle is made such that the cam face obstructs the scanning air jet during 55 seconds. Since here the included cam angle occupies its portion of a 90° segment of the disk 42 (see Figure 1), which is rotated at the rate of 90° in one minute, the full count of 55 seconds for 100 percent flow requires that the included angle at this radius be $$\frac{55}{60} \times 90$$

or 82.5°. At half flow the scanner tube is at a circle $d$ whose radius is determined by the scanner angular displacement of $$\frac{30°}{4}$$

or 7½°. The angle included between edges of the cam face at the half flow circle is 41¼° for a 27½ seconds count. Similarly, the radius of the one-quarter flow circle $e$ is for a scanner displacement angle of $$\frac{7\frac{1}{2}°}{4}$$

or 1⅞°, and the included angle is 20⅝° for a 13¾ seconds count. The pivot center of tube 40 is perpendicularly over the cam radius at the mid-point as shown in Figure 1.

Where a linear converter is used instead of a non-linear converter and the measuring air pressure, therefore, is directly proportional to flow, the angular positions of the scanner tube 40 are also proportional to flow. In such case the cam is shaped as shown in Figure 4. The cam radius $r'$ again is made equal to the chord of the angle $c'$ through which tube 40 travels. Both the angular measuring positions of the scanner tube 40 as increments of the 30° full displacement and the included cam face angles at the corresponding scanner positions are directly proportional to flow.

The area of the air jet opening depends on the clearance between the outlet end 41 of the scanner tube 40 and the disk 42 passing it. The space between the outlet end 41 of the air jet tube 40 and the disk 42 may be viewed as a jet port of variable size, which is restricted when the air jet tube passes over a cam and unrestricted when the tube passes over a space between two cams. The clearance between the end 41 of the tube 40 and the cams 45 can be as little as 0.003", and the unrestricted port diameter of the order of 1/16 of an inch.

The scanner tube 40 receives air under low pressure from an air pressure chamber 50, which is formed in a casing 51 closed by a diaphragm 52. The diaphragm 52 is flanged between the casing 51 and a cover 53. Air under pressure enters the scanning system through a connection 54 containing a restricting orifice. With a supply pressure of say 11 p. s. i. (pounds per square inch) the diameter of the orifice may be about 0.020". The air entering through the connection 54 supplies that lost through the scanner tube and that due to the leakage permitted around the tube 40, as will be described below.

When the scanner tube outlet is unrestricted, the pressure in the chamber 50 backs up to only a very low value, such as ¼ p. s. i., but when the scanner tube outlet is restricted by passage of a cam face, pressure in chamber 50 backs up to somewhat over 1 p. s. i.

To avoid introducing frictional forces in supplying air to the swingable air jet tube 40 from the stationary air pressure chamber 50, as by the use of a gland, the tube holder 55 is permitted to turn freely, and means are provided for greatly reducing air leakage around it. The inlet portion of the tube holder 55 has a hub 56 which is serrated, about 10 or more circular serrations being formed therein, with the outer edges of the serrations in close circumferential clearance with the bore 57 of the casing. Thus, a series of very small annular openings or orifices are formed between the serrated hub and the bore 57. With 10 serrations the leak velocity is reduced from 1 to $$\frac{1}{\sqrt{10}}$$

or to about ⅓, and with the clearances reduced to a minimum the leakage loss of air is very small, both at the ¼ p. s. i. normal pressure and at the 1 p. s. i. back pressure.

The portion of the hub 56 outside the casing 51 is supported by arms 58. An end cap 59 extends over the outer ends of the arms 58. Ball bearings are provided, as shown, for practically perfect alignment and substantially frictionless angular movement of the tube 40 with its hub 56. The sector gear 32 is rigidly fixed to, and supported by, the hub 56, as shown, so that the tube 40 rotates together with the sector gear 32.

A pusher pin 60 is mounted on the diaphragm plate 61 and extends through the cover 53 to the outside, as shown. A spring 62 encircles the pin 60 and urges the pin and diaphragm into the air supply chamber 50, the spring force being adjusted to overcome the normal air pressure in chamber 50 acting on the diaphragm 52. The space between diaphragm 52 and cover 53 is vented to atmosphere through a vent 63.

An electric switch 70 may be mounted in any suitable manner, such as on the casing cover 53. The switch is connected in an electric circuit by wires 71 and 72. The spring bladed contacts 73 and 74 of the switch 70 are spaced when the pusher pin 60 is retracted by the spring 62, and the circuit, therefore, is open. When the spring force is overcome by a build up of pressure in air supply chamber 50 in excess of the normal air pressure therein, the pin 62 is extended and closes the switch 70.

The operation of the apparatus will be readily understood. The scanner tube 40 is positioned by movement of the pressure responsive device 20 in response to the measuring air pressure from converter 12 proportionally to the flow head derived from venturi 10. If converter 12 is of the linear type, then the measuring air pressure is directly proportional to the flow, and the angular position of the scanner tube is also directly proportional to the flow. In either case, the cams 45 (shaped according to Figure 3 or 4) convert the angular position of the scanner tube 40, which is a function of flow, to timed intervals which are proportional to flow. As the disk 42 is rotated adjacent the outlet end of the tube 40, the clearance between the disk and the tube is alternately restricted when the tube passes over a raised cam face, and unrestricted when it passes over an area between two cams. The portion of each one minute cycle of rotation of the disk during which the clearance is thus restricted depends on the angular position of the scanning jet tube, as determined by the measuring air pressure.

Restriction of the clearance due to passage of the tube 40 over a raised cam face 45 creates an increased back pressure in the pressure chamber 50, which overcomes the force of the spring 62 and moves the diaphragm 61 and pusher pin 60 in switch closing direction. Therefore, the circuit through switch 70 is closed during each one minute time cycle for an interval proportional to flow.

Obviously, instead of raising the cam faces 45 on the disk 42, the spaces between the cam faces can be raised and the pusher pin be formed to close the switch 70 when it is retracted by the spring 62, such as, for example, by forking the end of the pin 60a and extending it around the contacts 73 and 74, as shown in Figure 5. Pressure in the chamber 50 then is less than the force of the spring 62 during each period while a cam face passes the tube 40 and the spring 62 retracts the pin 60a to close the switch 70 for timed periods. When a space between two cams passes the tube 40, back pressure in the chamber 50 overcomes the spring force to extend the pusher pin 60a and open the switch 70. Thus, whether the cam faces or the spaces between them are raised, the switch circuit is closed during each time cycle for periods proportional to flow and open during the balance of the cycle.

The circuit may be used to operate a counter, whose driving motor speed and gearing is selected to properly evaluate the count or integration, or a relay may be operated which can be used in a power circuit for driving a feeder or other machine which it is desired to operate for timed intervals proportional to flow.

I claim:

1. Apparatus for obtaining an impulse of a duration which is proportional to a condition comprising an open ended tube pivotally mounted for movement through a predetermined angle, means to position said tube along said angle proportionally to said condition, a disk rotatably supported adjacent and at right angles to the outlet end of said tube, means for rotating said disk at constant speed, means carried by said disk to intermittently restrict the clearance between said disk and the outlet end of said tube for an interval which is proportional to said condition, means for supplying air under pressure to said tube, and means operative to close an electric circuit in response to back pressure from said tube when said clearance is restricted.

2. Apparatus for obtaining an impulse of a duration proportional to a condition comprising an electric circuit, a normally open switch in said circuit, a tube pivotally mounted for movement through a predetermined angle, means for positioning said tube along said angle in proportion to a function of said condition, a disk rotatably supported in proximity and at right angles to the outlet end of said tube, means for rotating said disk at constant speed, the surface of said disk being shaped to intermittently restrict the clearance between said disk and the outlet end of said tube for periods proportional to said condition, means for supplying air under pressure to said tube, and means operable to close said switch in response to back pressure from said tube when said clearance is restricted.

3. Apparatus for converting a controlled measuring pressure which varies as a function of a flow to a timed interval varying as a function of the flow comprising a tube pivotally mounted for movement through a predetermined angle, means for positioning said tube along said angle in proportion to said controlled measuring pressure, a disk rotatably mounted normal to the outlet end of said tube and in close proximity thereto, means for driving said disk at constant speed, a cam face on said disk shaped as a function of flow, and means for supplying air under pressure to said tube, the clearance between said disk and the outlet end of said tube being restricted during passage of said cam whereby a back pressure is obtained from said tube during intervals varying as a function of the flow.

4. The apparatus of claim 3 wherein the measuring pressure is proportional to the flow head, the cam is a square root cam, and the duration of the back pressure is directly proportional to flow.

5. The apparatus of claim 3 wherein the measuring pressure, the cam, and the duration of back pressure are directly proportional to flow.

6. Apparatus for obtaining an impulse of a duration which is proportional to a condition comprising an electric circuit, a normally open switch in said circuit, an air pressure chamber, means for maintaining a predetermined pressure in said air pressure chamber, a tube having its inlet end connected to said air pressure chamber, said tube being pivotally mounted for movement through a predetermined angle, means for positioning said tube along said angle proportionally to said condition, a disk rotatably supported adjacent and at right angles to the outlet end of said tube, means for rotating said disk at constant speed, a cam face on said disk varying the clearance between said disk and the outlet end of said tube while passing the outlet of said tube during rotation of said disk, said cam face being shaped proportional to said condition, and means operable to close said switch in response to change in pressure in said chamber during passage of said tube over said cam face.

7. Apparatus for obtaining an impulse of a duration which is proportional to a condition comprising an electric circuit, a normally open switch in said circuit, a tube pivotally mounted for movement through a predetermined angle, means for positioning said tube along said angle proportionally to said condition, a disk rotatably supported adjacent and at right angles to the outlet end of said tube and forming with said outlet end an air jet port, means for rotating said disk at constant speed, a cam face on said disk restricting said port while passing the outlet end of said tube during rotation of said disk, said cam face being shaped proportional to said condition, means for supplying air under pressure to said tube, and means operable to close said switch in response to back pressure from said tube when said port is restricted.

8. Apparatus for obtaining an impulse of a duration which is a function of a rate of flow comprising a pressure responsive device, means for applying to said pressure responsive device a pressure varying as a function of the flow, an open ended tube pivotally mounted for movement through a predetermined angle, a transmission from said pressure responsive device to said tube to position said tube by movement of said device, an air inlet to said air pressure chamber, an air inlet to said chamber, said tube receiving air under pressure from said chamber, a disk rotatably supported at right angles to and in proximity to the outlet end of said tube, means for rotating said disk at constant speed, the surface of said disk being shaped to periodically change the clearance between said disk and the outlet end of said tube, for periods which are a function of said flow, and means operative to close an electric circuit in response to change in pressure in said air pressure chamber due to change in said clearance.

9. Apparatus for obtaining an impulse of a duration which is a function of a condition comprising an open ended tube pivotally mounted for movement through a predetermined angle, means for positioning said tube along said angle proportionally to a function of said condition, a disk rotatably mounted closely adjacent and at right angles to one end of said tube, said disk having four equal portions shaped to provide four cam faces, the radius of each cam face being equal to the chord of said predetermined angle and the shape of each cam face being a function of said condition, means for rotating said disk at constant speed, an air pressure chamber, an inlet for air under pressure into said air pressure chamber, an outlet from said air pressure chamber to said tube, an electric switch, an electric circuit through said switch, and means closing said switch in response to a change in pressure in said air pressure chamber from a predetermined value due to one of said cam faces passing said one end of said tube.

10. Apparatus for obtaining an electric impulse of a duration which is a function of a condition comprising a pressure responsive device, means for applying to said pressure responsive device a pressure varying as a function of said condition, an open ended tube pivotally mounted for movement through a predetermined angle, a transmission from said pressure responsive device to said tube to position said tube along said angle by movement of said device, an air pressure chamber, an inlet for air under pressure into said chamber, an outlet from said chamber to one end of said tube, a disk rotatably supported at right angles and in proximity to the outlet end of said tube and forming with said outlet end an air jet port, means for rotating said disk at constant speed, means carried by said disk to intermittently restrict said air jet port for a period which is a function of said condition, and means operative to close an electric circuit in response to back pressure in said air supply chamber when said port is restricted.

11. Apparatus for obtaining an impulse of a duration which is a function of a rate of flow comprising a pressure responsive device, means for applying to said pressure responsive device a pressure varying as a function of the flow, an open ended tube pivotally mounted for movement through a predetermined angle, a transmission from said pressure responsive device to said tube to position said tube by movement of said device, an air pressure chamber, an inlet for air under pressure into said chamber, an outlet from said chamber to the inlet end of said tube, a disk rotatably supported at right angles and in proximity to the outlet end of said tube and forming with said outlet end an air jet port, means for rotating said disk at constant speed, means carried by said disk to periodically restrict said air jet port for periods which are a function of said flow, and means operative to close an electric circuit in response to back pressure in said air pressure chamber when said port is restricted.

12. Apparatus for obtaining an impulse of a duration which is a function of a condition comprising an open ended tube pivotally mounted for movement through a predetermined angle, means for positioning said tube along said angle proportionally to a function of said condition, a disk rotatably mounted closely adjacent and at right angles to one end of said tube, said disk having four equal raised cam faces, the radius of each cam face being equal to the chord of said predetermined angle and the shape of each cam face being a function of said condition, means for rotating said disk at constant speed, an air pressure chamber, an inlet for air under pressure into said air pressure chamber, an outlet from said air pressure chamber to said tube, an electric switch, an electric circuit through said switch, and means closing said switch in response to a predetermined increase in pressure in said air pressure chamber due to back pressure from said tube.

13. Apparatus for obtaining an impulse of a duration proportional to a flow comprising an electric circuit, a normally open switch in said circuit, an air jet tube, an air pressure chamber having a cylindrical hollow portion, the inlet portion of said air jet tube having a hub fitting snugly into, and rotatably supported in, said cylindrical portion, a plurality of serrations in said hub, means for positioning said tube in response to a pressure varying as a function of said flow, a disk rotatably supported adjacent and at right angles to the outlet end of said tube, means for rotating said disk at constant speed, a cam face on said disk varying the clearance between the outlet end of said tube and said disk while passing the outlet end of said tube, said cam face being shaped proportional to said flow, and means operative to close said switch in response to change in pressure in said air supply chamber due to change in said clearance while said cam face passes said outlet end of said tube.

14. Apparatus for converting a controlled measuring pressure which varies as a function of a condition to a timed interval varying as function of the condition comprising a tube pivotally mounted for movement through a predetermined angle, means for positioning said tube along said angle in proportion to said controlled measuring pressure, means for supplying air under pressure to said tube, a disk rotatably mounted at right angles to the outlet end of said tube and in close proximity thereto, means for rotating said disk at constant speed, and a cam face on said disk shaped as a function of said condition, said cam face varying the normal clearance between said disk and the outlet end of said tube while passing said outlet end during rotation of said disk, whereby the back pressure from said tube is varied from normal for a timed interval varying as a function of said condition.

15. Apparatus for obtaining an impulse of a duration which is a function of a condition comprising an open ended tube pivotally mounted for movement through a predetermined angle, means for positioning said tube along said angle proportionally to a function of said condition, a disk rotatably mounted closely adjacent and at right angles to one end of said tube, means for rotating said disk at constant speed, the surface of said disk being shaped to form a plurality of cam faces and an equal number of raised spaces between said cam faces, each cam face being shaped as a function of said condition, said raised spaces restricting the clearance between said disk and said end of said tube to provide a predetermined back pressure from said tube while a raised portion passes said end, an electric circuit, an electric switch in said circuit, and means operative to close said switch in response to decrease in back pressure from said tube while a cam face passes said end.

16. Apparatus for obtaining an impulse of a duration which is proportional to a flow comprising an electric circuit, a normally open switch in said circuit, an open ended tube pivotally mounted for movement through a predetermined angle, means for positioning said tube along said angle proportionally to the flow head, said means including pressure responsive means, means for applying to said pressure responsive means a pressure which varies proportionally with the flow head, and means transmitting movement of said pressure responsive means to said tube, a disk rotatably supported adjacent and at right angles to one end of said tube, means for rotating said disk at constant speed, four raised square root cam faces on said disk, each face restricting the clearance between said end of said tube and said disk while passing the end of said tube, means for admitting air under pressure to the other end of said tube, and means operative to close said switch in response to back pressure from said tube when said clearance is restricted.

17. Apparatus for obtaining an impulse of a duration which is proportional to a condition comprising an open ended tube pivotally mounted for movement through a predetermined angle, means for positioning said tube along said angle proportionally to a function of said condition, a disk rotatably supported adjacent and at right angles to the outlet end of said tube and forming with said outlet end a port, means for rotating said disk at constant speed, a cam face on said disk shaped as a function of said condition and restricting the size of said port while passing said outlet end, an air pressure chamber having a flexible wall, means for maintaining a normal pressure of predetermined value in said air pressure chamber, the inlet portion of said tube being connected to said air pressure chamber, an electric switch, a circuit through said switch, a pin mounted on, and movable with, said flexible wall, and a spring urging said pin into said air pressure chamber with a force greater than said predetermined value, said pin being operable to close said switch for timed intervals proportional to said condition in response to back pressure in said air chamber in excess of said spring force due to restriction of said port by passage of said cam face.

18. Apparatus for obtaining a timed interval of a duration which is a function of a condition comprising a tube pivotally mounted for movement through a predetermined angle, means to position said tube along said angle proportionally to said condition, means for supplying gas under pressure to said tube, a disk rotatably mounted adjacent and at right angles to the outlet end of said tube, and means for rotating said disk at constant speed, the surface of said disk being shaped to intermittently vary the normal clearance between said disk and the outlet end of said tube for a period proportional to said condition, whereby the back pressure from said tube is varied from normal for a timed interval proportional to said condition.

19. Apparatus for obtaining a timed interval of a duration which is a function of a condition comprising a tube pivotally mounted for movement through a predetermined angle, means to position said tube along said angle proportionally to said condition, means for supplying gas under pressure to said tube, a member shaped as a function of said condition, and means for rotating said member at constant speed, said member being rotatable in a plane in close proximity of the outlet of said tube and restricting said outlet while passing it, whereby a back pressure is obtained from said tube for a timed interval varying as a function of said condition.

WALTER J. HUGHES.

References Cited in the file of this patent

UNITED STATES PATENTS

| Number | Name | Date |
|---|---|---|
| 2,039,717 | Hueber | May 7, 1936 |
| 2,214,159 | Bristol | Sept. 10, 1940 |
| 2,443,351 | Green | June 15, 1948 |